(12) United States Patent
Cooper et al.

(10) Patent No.: US 10,261,814 B2
(45) Date of Patent: Apr. 16, 2019

(54) LOCAL SERVICE CHAINING WITH VIRTUAL MACHINES AND VIRTUALIZED CONTAINERS IN SOFTWARE DEFINED NETWORKING

(71) Applicant: Intel Corporation, Santa Clara, CA (US)

(72) Inventors: Trevor Cooper, Portland, OR (US);
Brian J. Skerry, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 961 days.

(21) Appl. No.: 14/311,818

(22) Filed: Jun. 23, 2014

(65) Prior Publication Data
US 2015/0370586 A1 Dec. 24, 2015

(51) Int. Cl.
*G06F 9/455* (2018.01)
*G06F 15/173* (2006.01)
*G06F 12/02* (2006.01)

(52) U.S. Cl.
CPC ...... *G06F 9/45533* (2013.01); *G06F 9/45558* (2013.01); *G06F 12/0223* (2013.01);
(Continued)

(58) Field of Classification Search
CPC ... G06F 9/45533; G06F 12/23; G06F 12/0813
(Continued)

(56) References Cited

U.S. PATENT DOCUMENTS 7,685,281 B1 * 3/2010 Saraiya ................ G06F 13/387
370/392
2008/0005441 A1 * 1/2008 Droux ..................... H04L 49/10
710/306
(Continued)

FOREIGN PATENT DOCUMENTS

CN 102124525 A 7/2011
JP 2002-101124 A 4/2002
(Continued)

OTHER PUBLICATIONS

Office Action received for Japanese Patent Application No. 2015-104059, dated May 10, 2016, 4 Pages of Office Action including 2 pages of English Translation.
(Continued)

*Primary Examiner* — Farley Abad
*Assistant Examiner* — Getente A Yimer
(74) *Attorney, Agent, or Firm* — Law Office of R. Alan Burnett, P.S

(57) ABSTRACT

Methods, software, and apparatus for implementing local service chaining (LSC) with virtual machines (VMs) or virtualized containers in Software Defined Networking (SDN). In one aspect a method is implemented on a compute platform including a plurality of VMs or containers, each including a virtual network interface controller (vNIC) communicatively coupled to a virtual switch in an SDN. LSCs are implemented via a plurality of virtual network appliances hosted by the plurality of VMs or containers. Each LCS comprises a sequence (chain) of services performed by
(Continued)

virtual network appliances defined for the LSC. In connection with performing the chain of services, packet data is forwarded between VMs or containers using a cut-through mechanisms under which packet data is directly written to receive (Rx) buffers on the vNICs in a manner that bypasses the virtual switch. LSC indicia (e.g., through LSC tags) and flow tables are used to inform each virtual network appliance and/or or its host VM or container of the next vNIC Rx buffer or Rx port to which packet data is to be written.

24 Claims, 10 Drawing Sheets

(52) U.S. Cl.
CPC ............... *G06F 15/17331* (2013.01); *G06F 2009/4557* (2013.01); *G06F 2009/45595* (2013.01); *G06F 2212/154* (2013.01)

(58) Field of Classification Search
USPC .......................................................... 710/38
See application file for complete search history.

(56) References Cited

U.S. PATENT DOCUMENTS

| | | | |
|---|---|---|---|
| 2009/0216964 A1* | 8/2009 | Palladino | G06F 13/28 711/154 |
| 2009/0304002 A1* | 12/2009 | Yu | H04L 49/30 370/395.3 |
| 2011/0090915 A1* | 4/2011 | Droux | H04L 49/00 370/411 |
| 2013/0163427 A1 | 6/2013 | Beliveau et al. | |
| 2013/0279378 A1* | 10/2013 | Niea | H04B 3/36 370/293 |
| 2013/0318243 A1 | 11/2013 | Chinthalapati et al. | |
| 2014/0010085 A1 | 1/2014 | Kavunder et al. | |
| 2014/0101306 A1* | 4/2014 | Murgia | H04L 47/125 709/224 |
| 2014/0280834 A1* | 9/2014 | Medved | H04L 47/122 709/223 |
| 2015/0200844 A1* | 7/2015 | Zhu | H04L 45/507 370/392 |

FOREIGN PATENT DOCUMENTS

| | | |
|---|---|---|
| JP | 2007-158870 A | 6/2007 |
| JP | 2009-230479 A | 10/2009 |
| JP | 2009-230549 A | 10/2009 |
| JP | 2010-003061 A | 1/2010 |
| JP | 2011-070526 A | 4/2011 |
| JP | 2011-134320 A | 7/2011 |
| JP | 2012-003747 A | 1/2012 |
| JP | 2015-536003 A | 12/2015 |
| KR | 10-2009-0108044 A | 10/2009 |
| WO | 2011/068091 A1 | 6/2011 |
| WO | 2014/063129 A1 | 4/2014 |

OTHER PUBLICATIONS

Office Action received for Korean Patent Application No. 10-2015-0071740, dated Feb. 23, 2016, 5 pages (2 pages of translation and 3 pages of Official copy).

Notice of Allowance received for Korean Patent Application No. 10-2015-0071740, dated Mar. 8, 2017, 3 pages of Korean Notice of Allowance including 1 page of English Translation.

Office Action for Chinese Patent Application No. 201510264698.2, dated Nov. 29, 2017, 24 pages, including 15 pages of English Translation.

Office Action for Japanese Patent Application No. 2016-188478, dated Oct. 24, 2017, 13 pages, including 5 pages of English Translation.

Search Report for Japanese Patent Application No. 2015-104059, dated Apr. 20, 2016, 29 pages.

Office Action received for Korean Patent Application No. 10-2015-0071740, dated Aug. 29, 2016, 5 pages of Korean Office Action including 2 pages of English Translation.

Notice of Allowance received for Japanese Patent Application No. 2015-104059, dated Aug. 30, 2016, 3 Pages of Japanese Office Action only.

\* cited by examiner

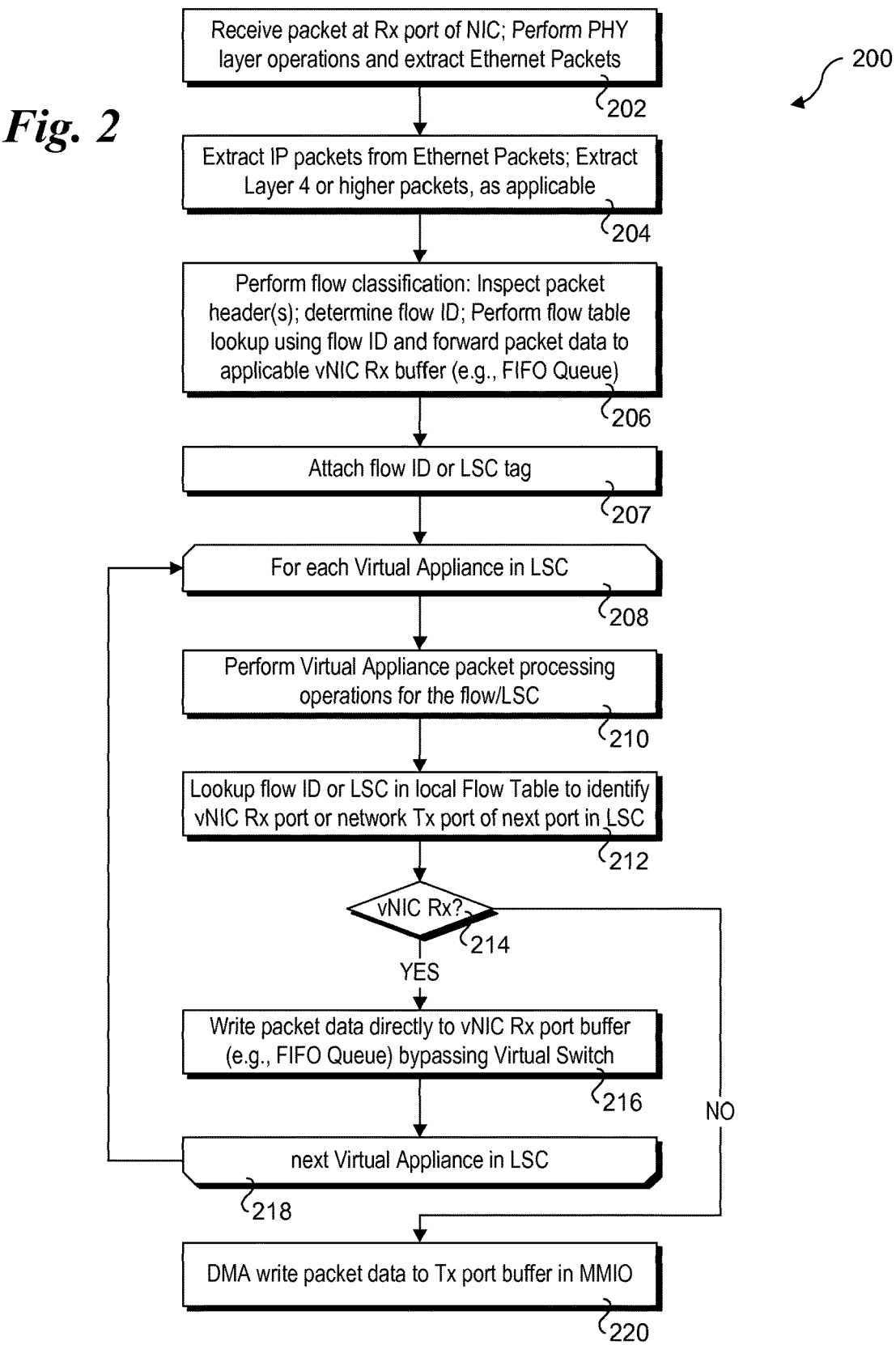

LOCAL SERVICE CHAINING WITH VIRTUAL MACHINES AND VIRTUALIZED CONTAINERS IN SOFTWARE DEFINED NETWORKING

BACKGROUND INFORMATION

Access to computer networks has become a ubiquitous part of today's computer usage. Whether accessing a Local Area Network (LAN) in an enterprise environment to access shared network resources, or accessing the Internet via the LAN or other access point, it seems users are always logged on to at least one service that is accessed via a computer network. Moreover, the rapid expansion of cloud-based services has led to even further usage of computer networks, and these services are forecast to become ever-more prevalent.

Networking is facilitated by various types of equipment including routers, switches, bridges, gateways, and access points. Large network infrastructure typically includes use of telecommunication-class network elements, including switches and routers made by companies such as Cisco Systems, Juniper Networks, Alcatel Lucent, IBM, and Hewlett-Packard. Such telecom switches are very sophisticated, operating at very-high bandwidths and providing advanced routing functionality as well as supporting different Quality of Service (QoS) levels. Private networks, such as Local area networks (LANs), are most commonly used by businesses and home users. It is also common for many business networks to employ hardware- and/or software-based firewalls and the like.

In recent years, virtualization of computer systems has seen rapid growth, particularly in server deployments and data centers. Under a conventional approach, a server runs a single instance of an operating system directly on physical hardware resources, such as the CPU, RAM, storage devices (e.g., hard disk), network controllers, I/O ports, etc. Under one virtualized approach using Virtual Machines (VMs), the physical hardware resources are employed to support corresponding instances of virtual resources, such that multiple VMs may run on the server's physical hardware resources, wherein each virtual machine includes its own CPU allocation, memory allocation, storage devices, network controllers, I/O ports etc. Multiple instances of the same or different operating systems then run on the multiple VMs. Moreover, through use of a virtual machine manager (VMM) or "hypervisor," the virtual resources can be dynamically allocated while the server is running, enabling VM instances to be added, shut down, or repurposed without requiring the server to be shut down. This provides greater flexibility for server utilization, and better use of server processing resources, especially for multi-core processors and/or multi-processor servers.

Under another virtualization approach, container-based OS virtualization is used that employs virtualized "containers" without use of a VMM or hypervisor. Instead of hosting separate instances of operating systems on respective VMs, container-based OS virtualization shares a single OS kernel across multiple containers, with separate instances of system and software libraries for each container. As with VMs, there are also virtual resources allocated to each container.

Deployment of Software Defined Networking (SDN) and Network Function Virtualization (NFV) has also seen rapid growth in the past few years. Under SDN, the system that makes decisions about where traffic is sent (the control plane) is decoupled for the underlying system that forwards traffic to the selected destination (the data plane). SDN concepts may be employed to facilitate network virtualization, enabling service providers to manage various aspects of their network services via software applications and APIs (Application Program Interfaces). Under NFV, by virtualizing network functions as software applications, network service providers can gain flexibility in network configuration, enabling significant benefits including optimization of available bandwidth, cost savings, and faster time to market for new services.

"Service chaining" is often used in the context of SDN to describe a flow of packets traversing a network that are processed by a series of network service elements implemented at various physical compute nodes. As used herein, the term "Local service chaining" (LSC) is used to describe a flow of packets traversing a network that is internal to a compute node that are processed by a series of network service elements implemented in VMs or virtualized containers. Under the conventional approach, LCS employs the use of a Virtual Switch (VS) or equivalent mechanism to switch packets between VMs. This switching mechanism requires compute resources and negatively impacts throughput capacity of the system. This problem is exacerbated when a large amount of traffic is processed through LSCs, as the processing of each packet may involve multiple data transfers via one or more VSs.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 2 is a flowchart illustrating operations and logic performed by software executing on the compute platform to facilitate implementation of LSCs.

DETAILED DESCRIPTION

Figure 1:
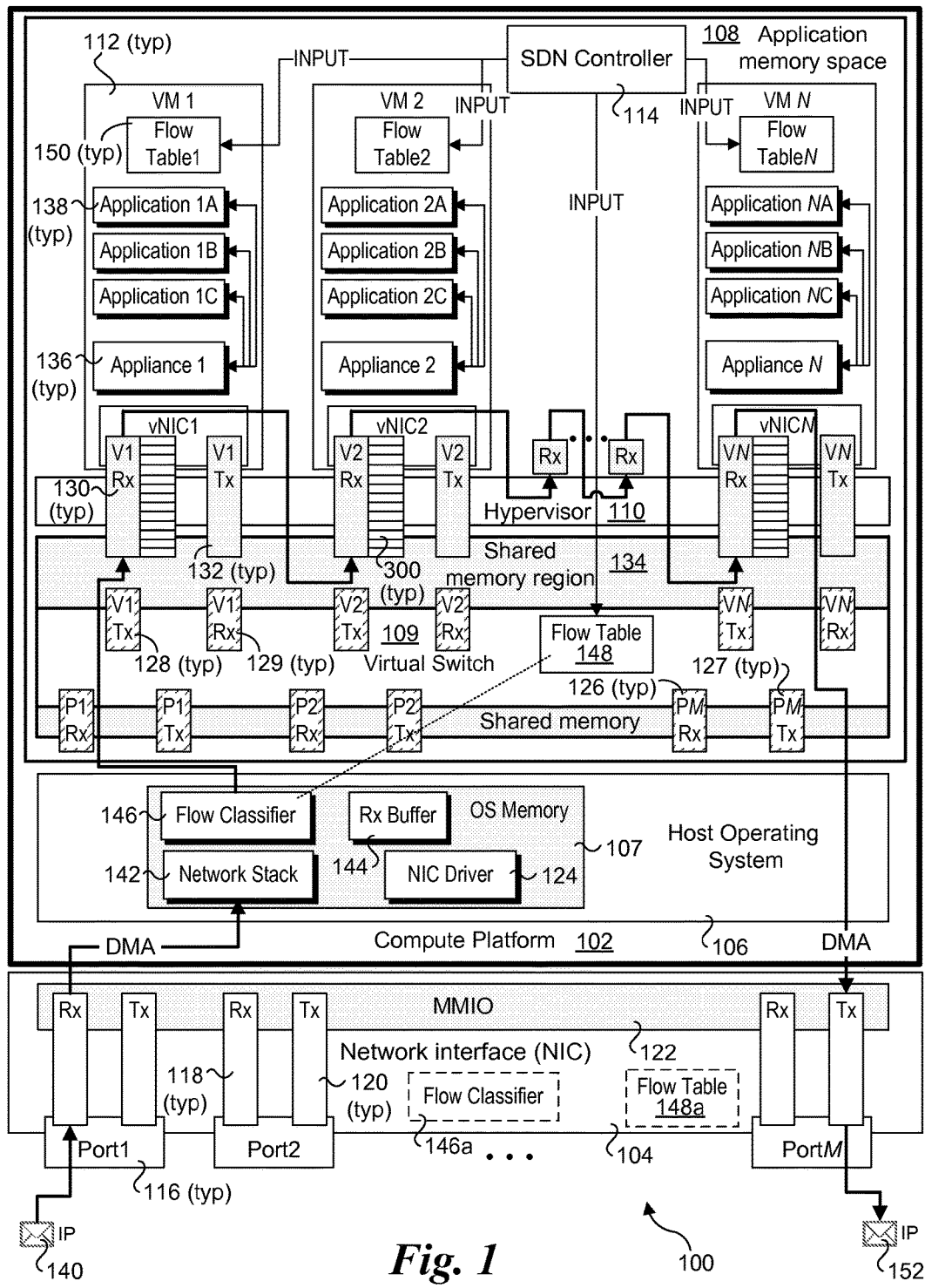
FIG. 1 is schematic diagram illustrating an architecture including virtual machines for a compute platform configured to perform packet processing operations through the use of LSCs.

Embodiments of methods, software, and apparatus for implementing local service chaining with virtual machines or virtualized containers in Software Defined Networking are described herein. In the following description, numerous specific details are set forth to provide a thorough understanding of embodiments disclosed and illustrated herein. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

As used herein, the terms "virtual appliance," "virtual network appliance," "network appliance," or simply "appliance" may be used interchangeably. In addition, for the purpose herein, including the claims, any software-based appliance relating to Software Defined Networking or configured to implement Network Function Virtualization may more generally be referred to as a "virtual appliance," with the understanding that virtual network appliances include any network appliance or virtualized entity that is configured to implement Network Function Virtualization and/or operations relating to Software Defined Networking. Accordingly, the terms virtual appliance in the following description includes all NFV appliances, as well.

In accordance with aspects of the embodiments described herein, packet throughput is accelerated by creating a "cut-through" mechanism that enables packets to be transferred between virtual network appliances and similar SDN components without the use of virtual switches. This is facilitated, in part, via use of "Local Service Chaining" (LSC), which is used herein to describe a flow of packets traversing a network that is internal to a compute node under which the packets are processed by a series of network service elements (e.g., virtual network appliances) implemented in multiple virtual machines or virtualized containers.

By way of example and without limitation, FIG. 1 shows an architecture 100 for a compute node (e.g., compute platform such as a server) configured to perform packet processing operations through the use of LSC. Architecture 100 includes a compute platform 102 coupled to a network interface 104 that may be integrated on the compute platform (e.g., as a network interface controller (NIC)) or otherwise operatively coupled to the compute platform (e.g., as a PCIe (Peripheral Component Interconnect Express) card installed in a PCIe expansion slot). Compute platform 102 includes a host operating system (OS) 106 running in OS memory 107 that is configured to host multiple applications running in an application memory space 108, which are depicted above host OS 106. This includes a virtual switch 109 and a hypervisor 110 that is configured to host N virtual machines 112, as depicted by virtual machines labeled VM 1, VM2 and VMN. The software components further include an SDN controller 114.

Network interface 104 includes M network ports 116 labeled Port1, Port2 . . . PortM, where M may be the same or different from N. Each network port 116 includes a receive (Rx) buffer 118 and a transmit (Tx) buffer 120. As used in the Figures herein, the Rx and Tx buffers and Rx and Tx queues that are depicted also may represent co-located Rx and Tx ports; to reduce clutter the Rx and Tx ports are not shown separately, but those skilled in the art will recognize that each Rx and Tx port will include one or more Rx and Tx buffers and/or queues.

Generally, a network interface may include relatively small Rx and Tx buffers that are implemented in the Rx and Tx ports, and then larger Rx and Tx buffers that may be implemented in input/output (JO) memory on the network interface that is shared across multiple Rx and Tx ports. In the illustrated example, at least a portion of the JO memory is memory-mapped JO (MMIO) 122 that is configured by a NIC driver 124 in OS memory 107 of host OS 106. MMIO 122 is configured to support direct memory access (DMA) data transfers between memory buffers in MMIO 122 and buffers in system memory on compute platform 102, as describe in further detail below.

Virtual switch 108 is a software-based entity that is configured to perform SDN switching operations internal to compute platform 102. In the illustrated example, virtual switch 108 includes a virtual Rx and Tx port for each physical Rx and Tx port on network interface 104 (e.g., for each of Port1-PortM), and a virtual Rx and Tx port for each of virtual machines VM 1-VM N. The virtual ports on the network interface side are depicted as Rx virtual ports 126 and Tx virtual ports 127, while the virtual ports on the VM side are depicted as Rx virtual ports 128 and Tx virtual ports 129. As further shown, a portion of each of Rx and Tx virtual ports 126, 127, 128, and 129 are depicted as overlapping a shared memory region 134 of the system memory address space (also referred to as a shared address space). Additionally, pairs of Rx and Tx virtual ports 130 and 132 are further depicted as extending into a respective virtual NIC (vNIC), as shown by vNIC1, vNIC2 and vNICN, wherein the vNICs are associated with respective virtual machines VM 1, VM 2 and VM N.

Each of virtual machines VM 1, VM 2, and VM N is shown including a virtual appliance 136 and three applications 138 with indicia identifying the corresponding VM the virtual appliance and applications are running on. For example, for VM 1 the virtual appliance is labeled "Appliance 1" and the applications are labeled "Application 1A," "Application 1B," and "Application 1C." Generally, each virtual appliance 136 may be implemented via one or more applications 138, and the inclusion of three applications is merely for illustrative purposes. During operation of compute platform 102, each of virtual appliances 136 is configured to perform one or more packet-processing services. Moreover, the packet-processing services are implemented in a chained manner as defined by the applicable LSC for the packet flow associated with each packet.

The concept of chained packet-processing services using local service chaining is further illustrated in FIG. 1 via operations and data transfers that are depicted in connection with processing of a packet 140, and further reference to a flowchart 200 shown in FIG. 2. Packet 140 is depicted as an IP (Internet Protocol) packet, and this exemplary use of an IP packet means that the packet employs IP addressing that is used, in part, to determine where packet 140 is forwarded in the network and handled internally by compute platform 102. As shown in a block 202 of flowchart 200, the process beings with Packet 140 being received from the network at Port1 of network interface 104. Generally, packet data is transferred over the links of a network as bitstreams of data. For example, for an Ethernet network, packet data is transferred as a stream of Ethernet frames. At Port1, applicable Physical Layer (PHY) operations are performed to extract Ethernet packets that encapsulate the packet data that is to be processed by virtual appliances 136. The extracted Ethernet packets are buffered in the Rx buffer 118 of Port1.

Next, in a block 204, IP packets are extracted from the Ethernet packets. Optionally, Layer 4 or higher level packets may be extracted, as applicable. Generally, the operations of block 204 may be performed by either network interface 104, by OS software-based networking components depicted as a network stack 142, or by a combination of the two using a split processing scheme. For example, some more recent NICs support Layer 3 (IP) packet processing operations and may also support TCP (Transaction Control Protocol) packet processing operations. Other Layer 4 and higher packet processing will usually be performed via software components in network stack 142, although these also may be implemented by a NIC or similar network interface.

In a block 206 flow classification of the packet is performed. This will usually involve inspecting applicable header fields in a packet header or headers to identify a packet flow that a received packet belongs to (if any). As described in further detail below, in some embodiments packet flow information may be explicitly defined in a packet header field. Packet flow classification may also be performed using data in multiple fields, such as through use of well-known N-tuple packet classification techniques.

Figure 3:
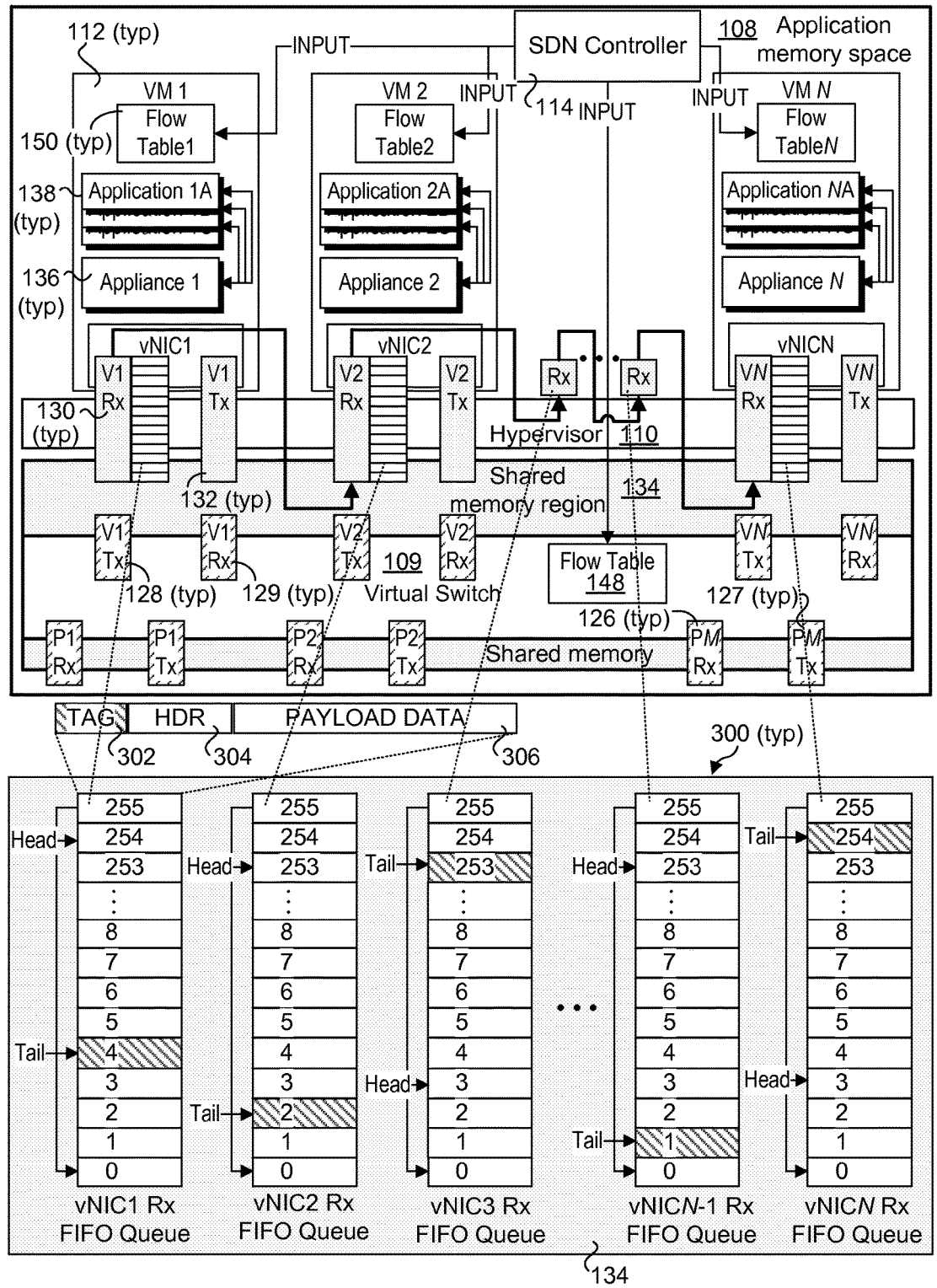
FIG. 3 is a schematic diagram illustrating further details of Rx FIFO queues in the shared memory region of the architecture of FIG. 1.

Generally, packet header inspection may be done using one or more of the following schemes. In one embodiment, packets are DMA'ed (e.g., using a DMA write operation) from Rx buffers in port 116 into an Rx buffer 144 in OS memory 107. For example, in one embodiment memory spaces in the NIC port Rx buffers are allocated for FIFO (First-in, First-out) queues that employ circular FIFO pointers, and the FIFO head pointer points to the packet that is DMA'ed into Rx buffer 144. Further details of how FIFO queues operate, according to one embodiment, are shown in FIG. 3 and described below. As an alternative, only the packet header is DMA'ed into Rx buffer 144. As yet another option, the packet header data is read "in place" without copying either the packet data or header into Rx buffer 144. In this instance, the packet header data for a small number of packets is read into a buffer associated with network stack 142 or a flow classifier 146 in host OS 106. Similarly, for flow classification that is performed by network interface 104 the packet header data may be read in place; however, in this instance the buffer is located in memory on network interface 104 that will typically be separate from MMIO 122 (not shown).

The result of flow classification returns a flow identifier (flow ID) for the packet. In one embodiment, the flow ID is added to a packet header field for packets that are received without an explicit flow ID, or, alternatively, a flow ID tag is attached to (e.g., prepended) or the packet is encapsulated in a "wrapper" that includes a field for the flow ID.

As shown in FIG. 1, in the illustrated embodiment packet classification is performed by flow classifier 146. Optionally, flow classification may be performed in network interface 104 via a similar flow classifier 146a. In one embodiment, a split classification scheme is implemented under which existing flows (e.g., previously classified flows) are identified in network interface 104 by flow classifier 146a, while packets that don't belong to an existing flow are forwarded to flow classifier 146 for packet classification corresponding to a new packet flow. Information for the new packet flow is then provided to flow classifier 146a. Under another embodiment, the list of classified flows maintained by a flow classifier 146a is less than a complete list maintained by flow classifier 146, and operates similar to a memory cache where flows pertaining to more recent packets are maintained in flow classifier 146a on the NIC and flows for less recent packets are replaced.

As further depicted in block 206, the flow ID is used as a lookup into a flow table 148, which is depicted as being part of virtual switch 109. In one embodiment, the flow table contains a column of flow ID's and a column of vNIC Rx port IDs such that given an input flow ID, the lookup will return a corresponding vNIC Rx port ID. Flow table 148 may also contain an LSC ID that may be used for an LSC tag or to a field in the packet wrapper or otherwise associated with the packet. Optionally, an LSC tag may be added by a first virtual appliance in a local service chain.

In addition to flow table 148 being implemented in virtual switch 109, all or a portion of the flow table may be implemented in host OS 106 or network interface 104 (neither of which is shown in FIG. 1). In embodiments employing all or a portion of a flow table in network interface 104, the flow table entries will generally be determined by software in host OS 106 and populated via an interface provided by NIC driver 124.

Once the vNIC Rx port ID is identified, the packet data is written to an applicable Rx buffer address. In the example illustrated in FIG. 1, this Rx port is labeled V1 Rx (the Rx port for vNIC 1 of virtual machine VM 1). In one embodiment, the packet data is copied from an Rx buffer in OS memory 107 (not shown) using a memory write operation under which data is copied from the OS memory Rx buffer to the applicable Rx buffer address. In another embodiment, the packet data is written from the Rx buffer of Port1 in MMIO 122 directly into the vNIC Rx buffer using a DMA write. For example, for packets having their headers inspected in place, a direct DMA write may be performed.

In one embodiment, the vNIC Rx buffers are implemented as FIFO queues with circular FIFO pointers. Details of one embodiment employing this configuration are shown in FIG. 3. As illustrated toward the bottom of FIG. 3, each vNIC Rx port 130 includes an associated vNIC Rx FIFO queue 300. Each vNIC Rx FIFO queue 300 includes an address space divided into multiple FIFO "slots"; under the illustrated embodiment there are 256 slots per FIFO queue, but this is merely illustrative of one example, as the number of FIFO slots may vary. The size used for each FIFO slot may also vary. In one embodiment, the size of each FIFO slot is the same as the size of a cache line used for application memory space 108. Each vNIC Rx FIFO queue 300 further includes a circular FIFO head pointer and a circular FIFO tail pointer. The circular FIFO head pointer points to the FIFO slot that is currently at the logical "top" of the FIFO queue, while the tail pointer points to a FIFO slot corresponding to the current logical "bottom" of the FIFO queue. The operations of FIFO queues using head and tail pointers are well-known in that art, so further details of these operations are not provided herein.

In one embodiment, each vNIC is implemented via a set of one or more software modules. Under an object-oriented design, each Rx FIFO queue may be implemented as an instance of a corresponding class (e.g., Rx_FIFO_queue). As is well-known, classes provide methods for implementing functions that operate on class objects (e.g., data) and interfaces for passing data to and receiving data from other software components (e.g., other classes).

In one embodiment, a DMA write request is sent to the Rx_FIFO_queue (class) instance for the vNIC1 Rx FIFO queue. In response to receiving the DMA write request, a method in the Rx_FIFO_queue instance identifies the memory address of the FIFO slot currently pointed to by the tail pointer and returns the address to the DMA write requester (e.g., an embedded software module on network interface 104). A DMA engine or the like (not shown) then writes the packet data from its location in MMIO 122 to the memory address for the FIFO slot. For instances in which the packet data spans multiple FIFO slots, multiple DMA writes may be performed in sequence. For illustrative purposes, the packet data is shown as being written to the bottom of the representation of the vNIC Rx ports; however, those skilled in the art will recognize that the location in the Rx FIFO queue of the slot at which the packet data is written will be the logical "bottom" of the FIFO buffer pointed to by the FIFO tail pointer.

Next, in a block 207 a flow ID tag or LSC tag is attached to the packet data. As shown in FIG. 3, in one embodiment the data written to a first FIFO slot (of one or more slots to which the packet data is written) contains a tag 302 prepended to packet data comprising a packet header 304 and packet payload data 306. In one embodiment, tag 302 is used to store in LCS tag (e.g., LSC ID value). Optionally, tag 302 may be used to store a flow ID. As is well-known, the size of an IP packet (or other types of packets) may vary, while the length of a packet protocol header will generally be the same (noting that some protocols define packet headers with optional fields that when used change the header length). In view of the variable-length packet size, the packet data for a given packet may be written to one or more FIFO slots.

As depicted by the loop delineated by start and end loop blocks 208 and 218, multiple operations are performed for each virtual appliance in a local service chain associated with a give packet flow (or alternatively, as explicitly identified by an LSC ID in a LSC tag, packet header or wrapper). Each LSC comprises multiple services performed by virtual network appliances that are chained together in a sequence in a manner similar to a set of pipelined services. Example services may include NAT (Network Address Translation) services, firewall services, packet-processing services, WAN Optimization, Virtual Private Network Gateway, Video Transcoding, Content Distribution Network services, etc. For illustrative purposes, FIG. 1 shows a chained sequence from Appliance 1 to Appliance 2 . . . to Appliance N. However, this is merely exemplary as the LSC may traverse any combination of Appliances. Moreover, the LSC need not traverse Appliances in an increasing order (e.g., an LSC could be Appliance 3 to Appliance 2 to Appliance 5 . . . ). It is also possible for multiple Appliances to be implemented to perform the same service or sets of services. Alternatively, a given Appliance may be configured to perform different services for different packet flows.

Returning to the processing loop in flowchart 200, in a block 210 the packet processing operations for the flow and/or LSC for the current virtual appliance in the LSC chain are performed. In one embodiment, the packet-processing operations will be performed on a given packet in the vNIC Rx FIFO queue pointed to by the FIFO head pointer. Some virtual appliances will read the packet data and perform processing using that data (e.g., forward the packet data to a consumer application), while other virtual appliances may modify the packet data (e.g., modify one or more fields in a packet header). In cases where the packet data is modified, the packet data can either be modified in place, or packet data may be copied into a buffer on the VM allocated for the virtual appliance (not shown in FIG. 1) and then modified.

Continuing at a block 212, upon completion of the operations performed by a given virtual appliance, a determination is made to where the packet data is to be forwarded so it can be accessed by either the next virtual appliance in the LSC, or if the current virtual appliance is the last virtual appliance in the LSC, what Tx network port to forward the packet to. In one embodiment, this is performed using the LSC tag value as a lookup into a local flow table 150. Optionally, the local flow table may contain flow IDs rather than or in addition to LSC tag values. Generally, local flow tables 150 may be configured in a similar manner to flow table 148; however, rather than pointing to the vNIC Rx port (or Rx FIFO queue) for the VM hosting the first virtual appliance in the LSC, the local flow table points to the vNIC Rx port (or Rx FIFO queue) for the VM hosting the next virtual appliance in the LSC. It is also noted that flow table 148 may contain information pertaining to non-LSC flows (or otherwise such information may be maintained in a separate table accessible to virtual switch 109.

Under the conventional approach, VMs are allocated separate memory spaces and data is transferred between these separate memory spaces through use of virtual switches. This entails first copying the data to a vNIC Tx port, forwarding the data to a Rx port of the virtual switch (via a memory write), determining via the virtual switch the vNIC Rx port to which the data is to be written, copying or writing the data to the virtual switch Tx port connected to that vNIC Rx port, and then writing the data to the vNIC Rx port. In practice, each of these writes are to a buffer, such as a FIFO queue, and the switching processes involves a significant amount of overhead. Moreover, when multiple packet flows are being switched simultaneously, there is a potential for congestion as one or more of the virtual switch ports.

To better understand the conventional virtual switch operation, consider a packet processing sequence that involves operations performed by a series of virtual network appliances, A, B, C, and D, each of which performs one or more operations relating to the packets it receives. These operations are chained such that a sequence of operations a, b, c, and d, are performed by respective virtual network appliances A, B, C, and D, and each of the virtual network appliances are hosted by a separate $VM_{A-D}$ connected to a virtual switch S. Under the existing approach, the packet flow would be handled as follows: $VM_A$ to S to $VM_B$ to S to $VM_C$ to S to $VM_D$. Each transfer to and from virtual switch S requires the use of separate receive and transmit buffers/queues that are implemented for separate virtual switch ports to which virtual machines $VM_A$, $VM_B$, $VM_C$ and $VM_D$ are respectfully connected.

In accordance with an aspect of the embodiments herein, a "cut-through" mechanism is implemented under which data is written directly from a first vNIC Rx buffer (e.g., vNIC Rx FIFO queue) or a buffer on a VM hosting a virtual appliance performing a current service in an LSC to the vNIC Rx buffer (e.g., vNIC Rx FIFO queue) of the VM hosting the virtual appliance that is to perform the next service in the LSC. This is facilitated, in part, through the use of shared memory region 134: Since the vNIC Rx FIFO queues are in a shared memory region accessable to all of the VMs, any VM can write to the vNIC Rx FIFO queue of any other VM in a manner that bypasses the virtual switch. This provides a significant reduction in memory transfers, as well as eliminates corresponding latencies incurred during virtual switching operations.

As depicted by a decision block 214, if the next buffer is a vNIC Rx FIFO queue the flowchart logic proceeds to a block 216 in which the packet data is written directly to the identified vNIC Rx FIFO queue, thus bypassing virtual switch 134. As before and as depicted, the packet data is written to the bottom of the vNIC Rx port representation. Also as before, this may be effected by writing the data to an address of the slot in the Rx FIFO queue currently pointed to by the FIFO tail pointer.

If the flow ID lookup in block 212 identifies the next buffer as a network Tx port, the flowchart logic proceeds to a block 220 in which a DMA write of the packet data from the current vNIC Rx FIFO slot(s) (or local buffer if associated with the current virtual appliance) to the network Tx buffer, which is located in the address space of MMIO 122. In the example illustrated in FIG. 1, this is depicted as a direct transfer of packet data from the Rx FIFO queue of vNICN to the Tx buffer of PortM on network interface 104. Alternatively, rather than a direct DMA data transfer, the packet data may be forwarded through virtual switch 109. In one embodiment, the packet data is copied directly from the vNICN Rx FIFO queue (or a buffer on VM N) to the network Tx buffer on the virtual switch (rather than being forwarded via vNICN's Tx port).

As depicted at the lower right-hand corner of FIG. 1, a packet 152 is transmitted from the Tx port of PortM into the network. Generally, the headers of packets 140 and 152 may differ, while the packet payload data may remain the same. For example, one or more fields in the packet header for a given packet may be changed during the LSC processing operations performed by the virtual appliances. In some instances, the packet payload data may also change as a result of services performed by an LSC.

The foregoing processing of packet 140 illustrates one technique for processing packets on a per-flow basis. In one embodiment, SDN controller 114 is configured to manage flow ID and/or LSC data used by flow table 148 and local flow tables 150. Packets for a given packet flow may be serviced using an LSC comprising a chained sequence of services performed by respective virtual appliances, as discussed above. In one embodiment, an entry point (e.g., an ingress Rx port, Rx buffer or Rx FIFO queue) for a flow ID or LSC ID in a flow table is used to lookup the next entry point for the service chain (e.g., the next Rx port, Rx buffer, or Rx FIFO queue). Accordingly, the flow tables may generally comprise two or more columns, one containing the flow ID or LSC ID and the other containing the next entry point. In another embodiment, a flow ID is used to forward a packet received from the network to a first virtual appliance, which then does a flow ID-to-LSC ID mapping and attaches an LSC tag to the packet for further processing.

LSCs used on a per-flow implementation may be either preconfigured by SDN controller 114, or determined when a flow first appears. For example, in accordance with the OpenFlow protocol, packet flows and corresponding LSCs may be determined during run-time operations. The particular sequence chain for the LSC may be determined by logic in SDN controller, logic in another component, such as a central SDN controller (e.g., orchestrator) or the like, or a combination of SDN controller components and related components.

Figure 4:
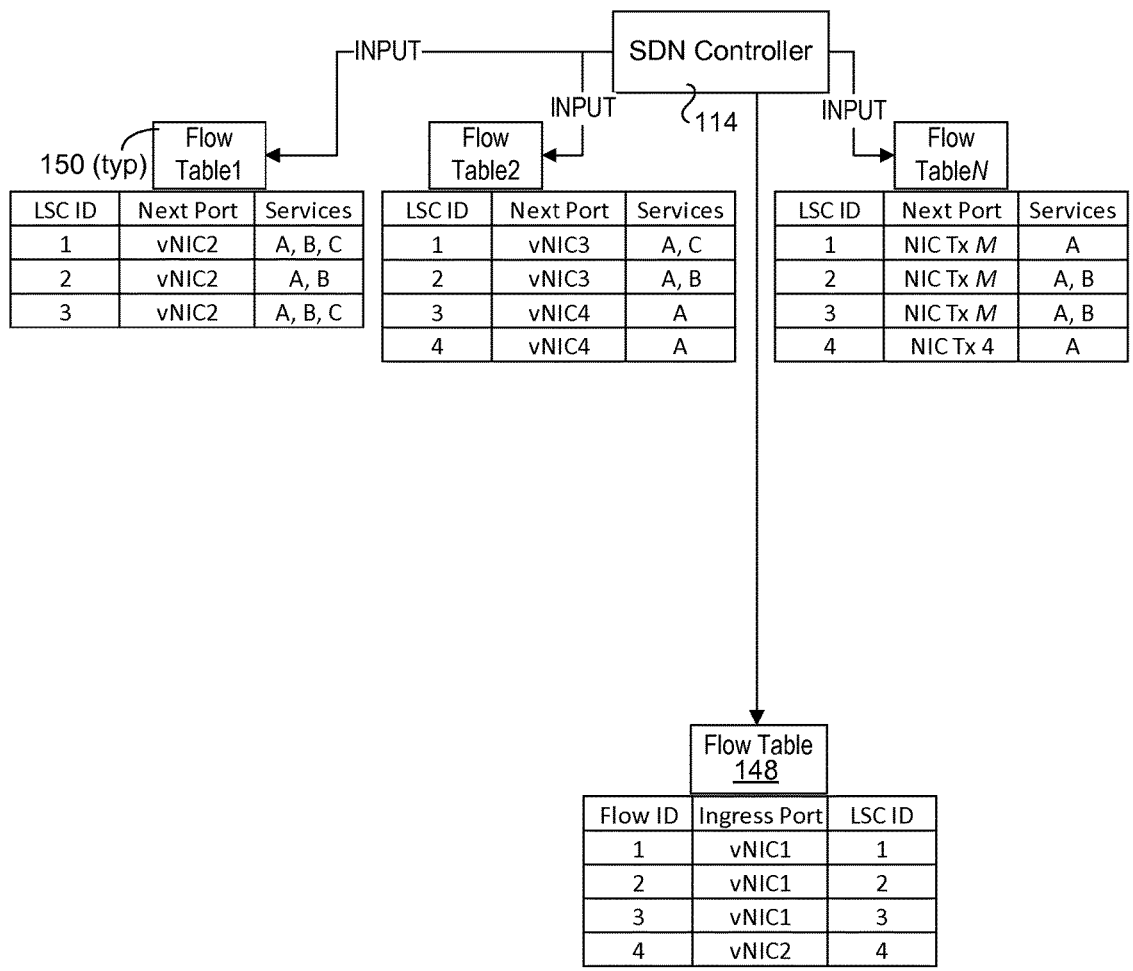
FIG. 4 is a diagram illustrating a first set of exemplary data contained in the flow tables of the architecture of FIG. 1 for implementing LSC operations using LSC IDs.

FIG. 4 depicts a set of exemplary table data for flow tables 148, Table1, Table2, and TableN. Flow table 148 includes a Flow ID column containing flow IDs, an Ingress Port column containing ingress port IDs, and an LSC ID column containing LSC IDs. Each of Table1, Table2 and TableN include an LSC ID column, a Next Port column, and a Services column. In one embodiment, the table data for each of tables 148, Table1, Table2, and TableN is managed by SDN controller 114. Generally, the table data may be populated during initialization of the compute platform and/or during run-time operations.

In one embodiment, the table data is implemented as follows. In conjunction with flow classification, a flow ID for the packet is determined. This is used as a lookup for flow table 148. From the flow ID the ingress port of the VM hosting the first virtual appliance in the service chain can be determined. The LSC ID also can be determined. As an option, flow table 148 may not include an LSC ID column and the flow ID-to-LSC ID mapping is performed by the first virtual appliance in each LSC.

As shown, the ingress port need not be the same for each flow. Depending on the services that are to be performed, an LSC may skip one or more virtual appliances. Also, the services performed by a given virtual appliance may also be different, depending on the LSC ID. The use of 'A', 'B', and 'C' in the Services columns corresponds to services performed by the virtual appliance each flow table 150 corresponds to. The inclusion of the Services column is optional, as under some implementation a give virtual appliance will perform the same services for all LSCs (or flows) that it provides services to. In addition, the egress port at the network adaptor/NIC may also differ, depending on the particular LSC.

Figure 4A:
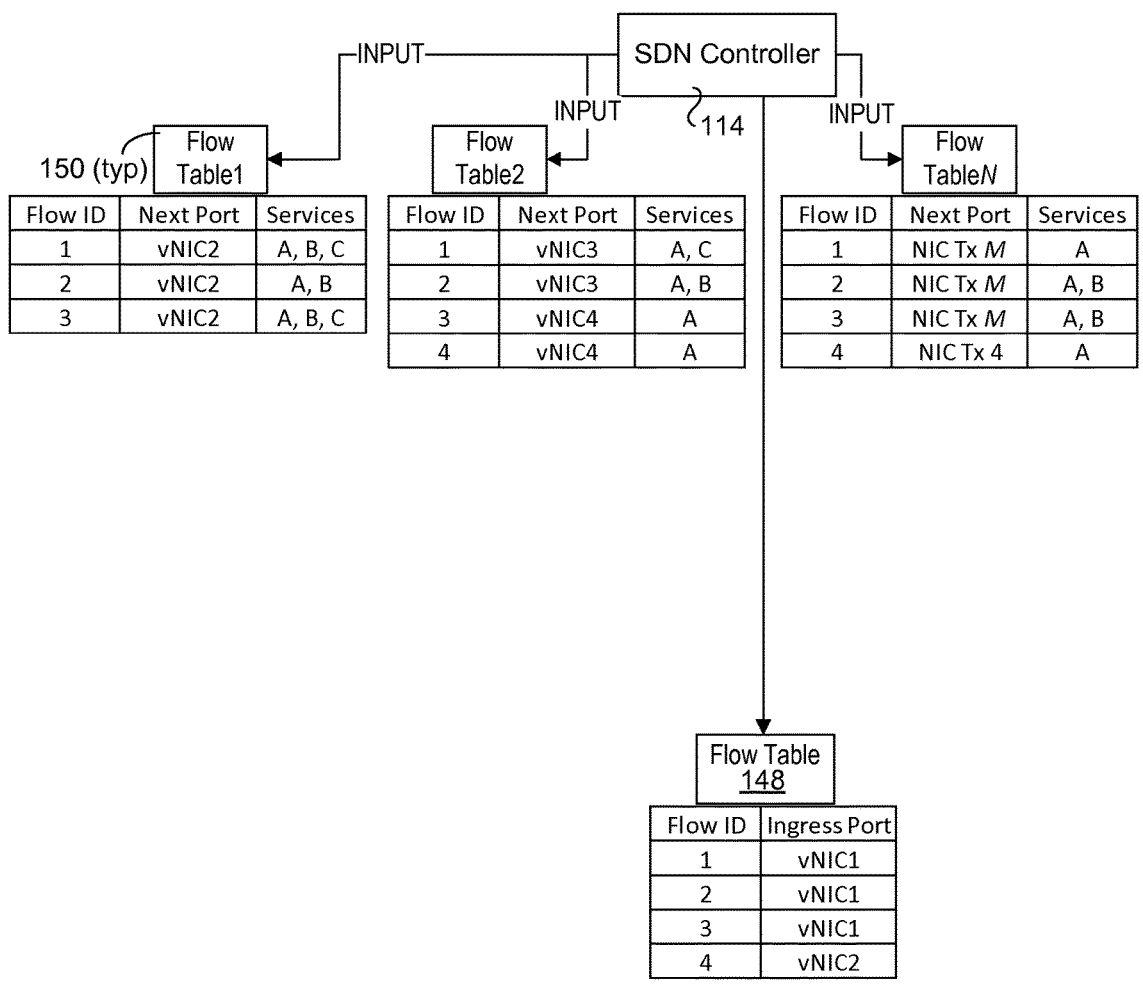
FIG. 4a is a diagram illustrating a second set of exemplary data contained in the flow tables of the architecture of FIG. 1 for implementing LSC operations using flow IDs.

FIG. 4a illustrates an alternative flow table scheme that employs flow IDs for flow tables 150 rather than LSC IDs. The flow ID-to-LSC mapping is performed internally by SDN controller 114 such that flow IDs may be used in place of LSC IDs. The remainder of the processing logic remains the same.

Figure 4B:
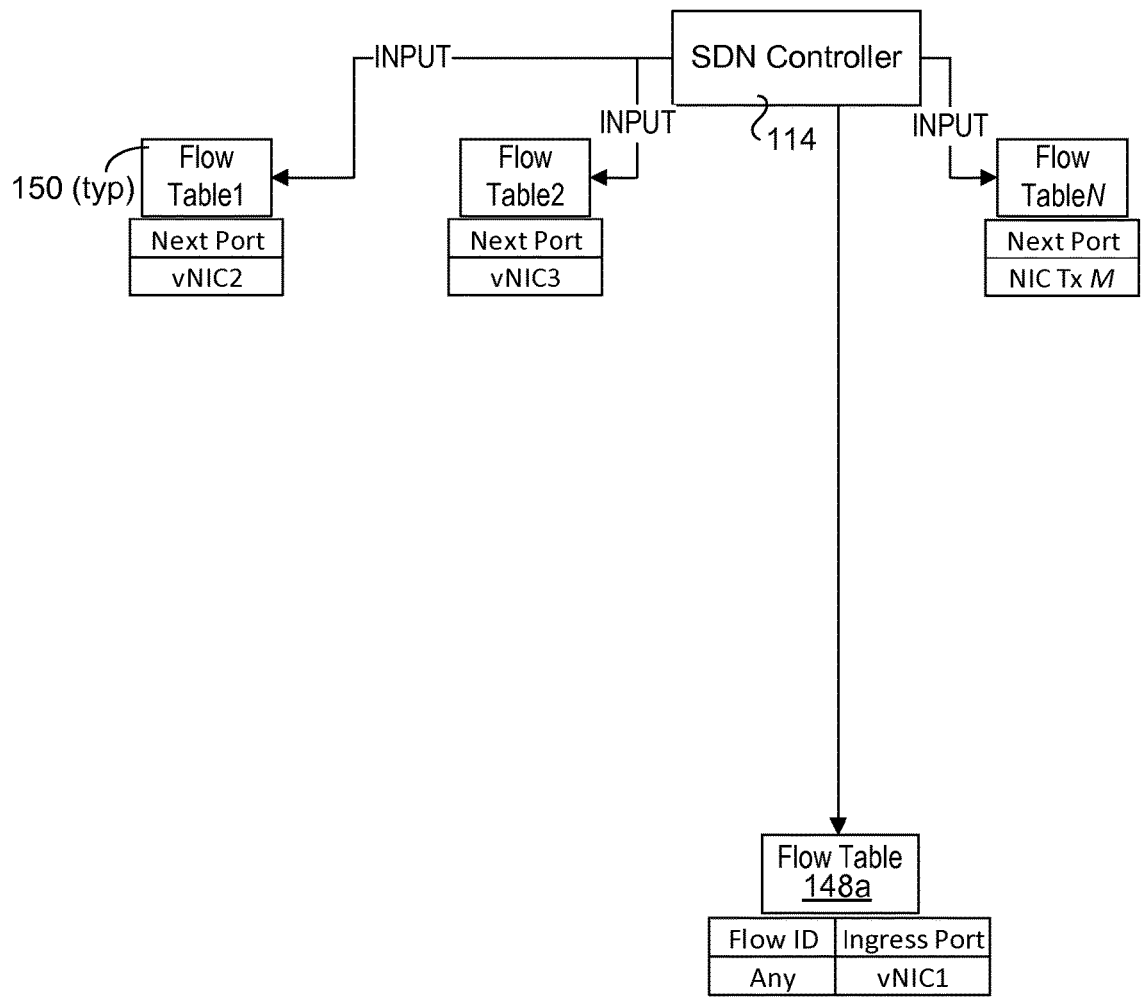
FIG. 4b is a diagram illustrating a third set of exemplary data contained in the flow tables of the architecture of FIG. 1 for implementing a predefined LSC for all packets received at a predefined network port.

In addition to per-flow local service chaining, a compute platform may be preconfigured to perform the same set of services (and thus implement the same LSC) for all packets received by a network interface or all packets received at a predetermined port of the network interface. FIG. 4b shows exemplary table data in flow table 148a, Flow Table1, Flow Table2, and Flow TableN to implement a single, pre-determined LSC. As illustrated, the ingress port for all flows is vNIC1 Rx. Meanwhile, the Next Port for each virtual appliance is the vNIC Rx port for the next virtual appliance in the LSC. For illustrative purposes, flow table data are shown for implementing a pre-determined LSC. In practice, other techniques could be used, such as configuring software variables and/or software instructions to implement the pre-determined LSC. For instance, software could be downloaded to each of the virtual machines to implement the LSC without the use of flow tables. Similarly, a network adaptor or NIC could be configured to forward (e.g., via a DMA write) all packets to the ingress vNIC Rx port for the LSC.

Figure 1A:
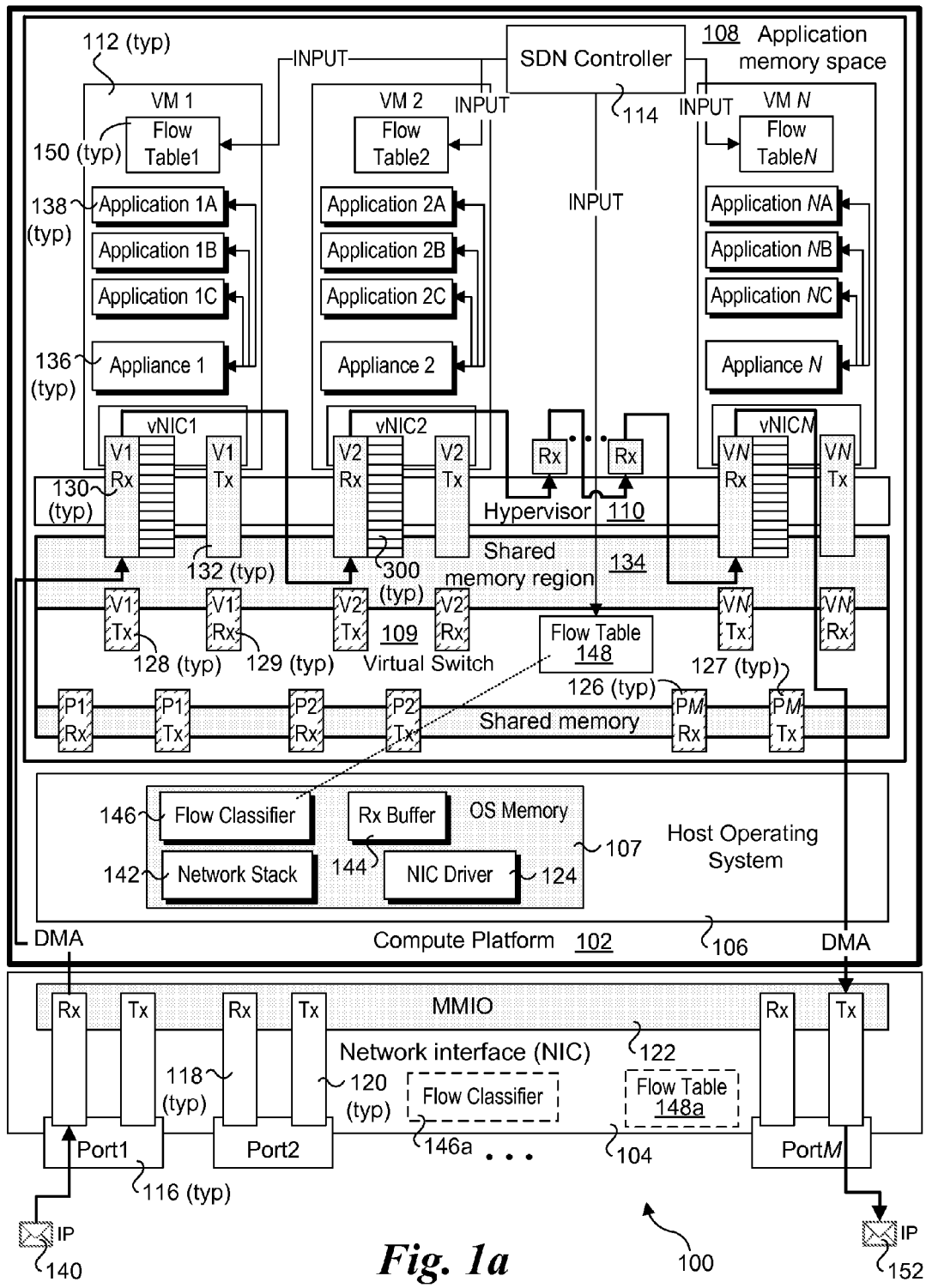
FIG. 1a is a schematic diagram illustrating an augmented version of the compute platform of FIG. 1 under which packet data is transferred directly from a network interface to a receive (Rx) buffer in a virtual network interface controller (vNIC)

FIG. 1a illustrates the processing of packet 140 using a pre-determined LSC. As illustrated, packet 140 is DMA'ed from Port1's Rx port to vNIC1's Rx port, bypassing any operations that previously may have been performed by host OS 106, and also bypassing virtual switch 109. Under another embodiment, packets may be DMA'ed from the network interface to Rx buffer 144 and then to vNIC1's Rx port.

In accordance with another method, LSCs are implemented using meta-data added to the packet header. Under this technique, an entity (e.g., an orchestrator or the like) on an external platform may determine the elements of the entire service chain, then once the service chain reaches the platform with the LSC, software operating on the platform uses this meta-data to determine the packet flow. In this way, an LSC could interoperate with a larger service chain that is implemented via virtual appliances operating on multiple platforms.

Generally, in a Network Function Virtualization system where VM placement is done by an orchestrator, it may be advantageous for an orchestrator to instantiate VMs hosting the virtual appliances of a service chain into a single physical platform, such that inherent benefits of implementing Local Service Chains in accordance with the embodiments herein can be taken advantage of. For example, since the same services are performed for each packet for a given flow in a pipelined manner, the potential issue of FIFO overflow (no room in a FIFO queue to add more packet data) can be eliminated through use of appropriately-sized FIFO queues. This approach also eliminates any latencies that may occur as a result of traffic congestion in a virtual switch; such latencies result in reducing the processing performance of the entire service chain, since a latency for a single packet results in a processing latency for all subsequent packets.

It is noted that while FIFO queues are illustrated in the drawings and described herein, it is possible to use other types of queues as are known in the art. However, for chained operations, FIFO queues provide inherent advantages through their simplicity and lack of overhead. Furthermore, although a single FIFO queue is shown for each vNIC Rx port, one or more FIFO queues may be employed. For example, separate FIFO queues may be used for respective flows and/or LSCs.

Computer platforms may also be configured to support both LSC flows and non-LSC flows. For example, during flow classification a packet may be identified as belonging to a flow that is not associated with an LSC. Accordingly, the packet could be processed using conventional techniques for processing packet flows.

In addition to the use of flow tables 150, other techniques may be used for enabling each VM to determine what actions should be taken for each packet it receives that is associated with an LSC. For example, in one embodiment an LSC module in the ingress VM tags the packets with an appropriate LSC label that is used by each subsequent VM that receives the packet to determine what services, if any, should be performed on the packet and to determine the next VM the packet should be forwarded to.

Figure 5:
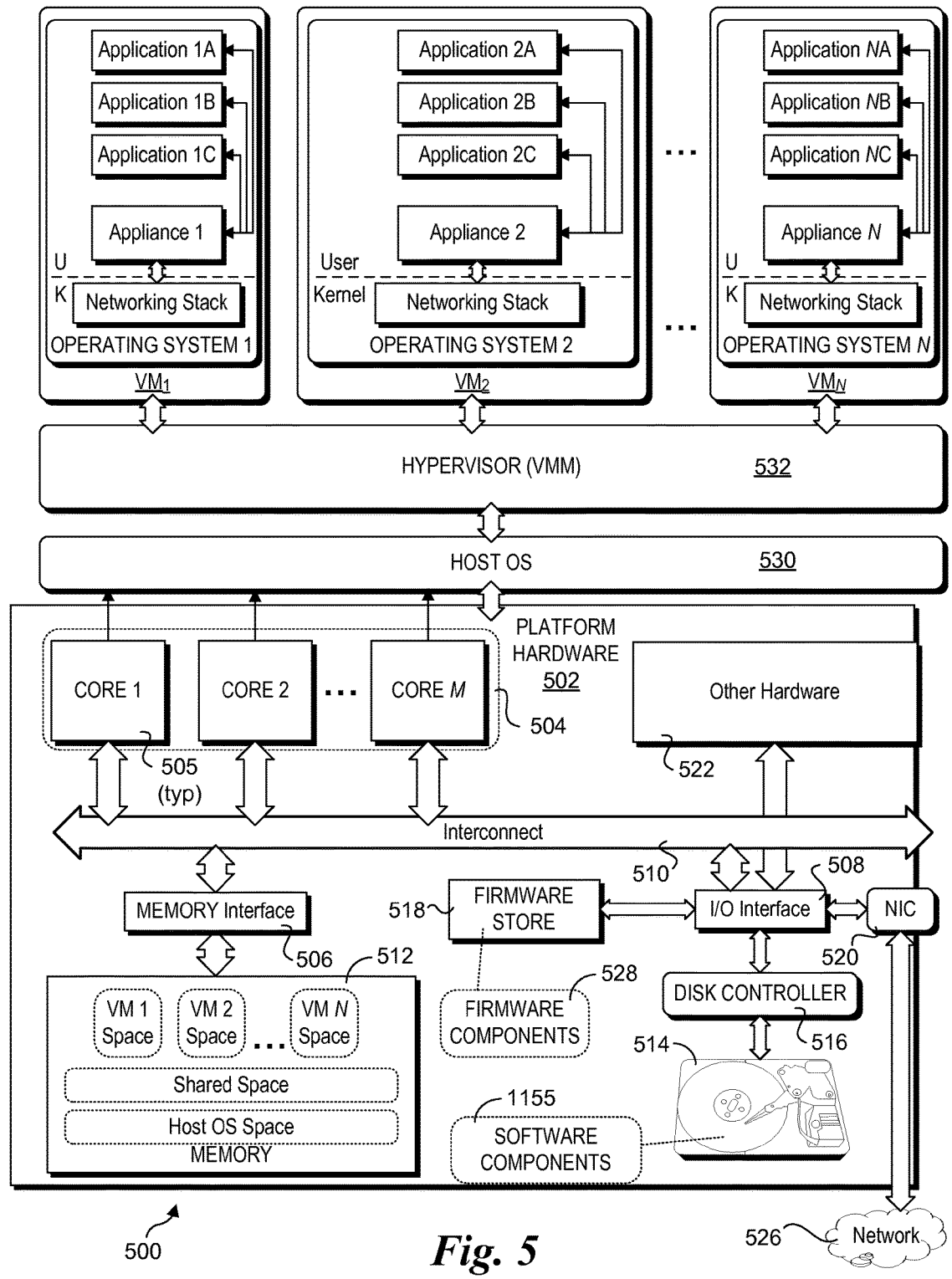
FIG. 5 is a schematic diagram of a first exemplary host platform hardware and software architecture including virtual machines via which aspects of the embodiments disclosed herein may be implemented.

FIG. 5 shows an exemplary host platform configuration 500 including platform hardware 502 and various software-based components. Platform hardware 502 includes a central processing unit (CPU) 504 coupled to a memory interface 506 and an input/output (I/O) interface 508 via an interconnect 510. In some embodiments, all or a portion of the foregoing components may be integrated on a System on a Chip (SoC). Memory interface 506 is configured to facilitate access to system memory 512, which will usually be separate from the SoC.

I/O interface 508 is illustrative of various I/O interfaces provided by platform hardware 502. Generally, I/O interface 508 may be implemented as a discrete component (such as an ICH (I/O controller hub) or the like), or it may be implemented on an SoC. Moreover, I/O interface 508 may also be implemented as an I/O hierarchy, such as a Peripheral Component Interconnect Express (PCIe™) I/O hierarchy. I/O interface 508 further facilitates communication between various I/O resources and devices and other platform components. These include a non-volatile storage device, such as a disk drive 514 that is communicatively coupled to I/O interface 508 via a disk controller 516, a firmware store 518, a NIC 520, and various other I/O devices, collectively depicted as other hardware 522.

In general, CPU 504 may comprise a single core processor or a multi-core processor, such as depicted by M cores 505. The multiple cores are employed to execute various software components 424, such as modules and applications, which are stored in one or more non-volatile storage devices, as depicted by disk drive 514. More generally, disk drive 514 is representative of various types of non-volatile storage devices, including both magnetic- and optical-based storage devices, as well as solid-state storage devices, such as solid state drives (SSDs) or Flash memory. Optionally, all or a portion of software components 524 may be stored on one or more storage devices (not shown) that are accessed via a network 526

During boot up or run-time operations, various software components 524 and firmware components 528 are loaded into system memory 512 (as depicted by FW space) and executed on cores 505 as processes comprising execution threads or the like. Depending on the particular processor or SoC architecture, a given "physical" core may be implemented as one or more logical cores, with processes being allocated to the various logical cores. For example, under the Intel® Hyperthreading™ architecture, each physical core is implemented as two logical cores.

Under a typical system boot for platform hardware 502, firmware 528 will be loaded and configured in system memory 512, followed by booting a host OS 530. Subsequently, a hypervisor 532, which may generally comprise an application running on host OS 530, will be launched. Hypervisor 532 may then be employed to launch various virtual machines, $VM_{1-N}$, each of which will be configured to use various portions (i.e., address spaces) of system memory 512. In turn, each virtual machine $VM_{1-N}$ may be employed to host a respective operating system $534_{1-N}$.

During run-time operations, hypervisor 532 enables reconfiguration of various system resources, such as system memory 512, cores 505, and disk drive(s) 514. Generally, the virtual machines provide abstractions (in combination with hypervisor 532) between their hosted operating system and the underlying platform hardware 502, enabling the hardware resources to be shared among $VM_{1-N}$. From the viewpoint of each hosted operating system, that operating system "owns" the entire platform, and is unaware of the existence of other operating systems running on virtual machines. In reality, each operating system merely has access to only the resources and/or resource portions allocated to it by hypervisor 532.

As further illustrated in FIG. 5, each operating system includes a kernel space and a user space, both of which are implemented as memory spaces in system memory 512. The kernel space is protected and used to run operating system kernel components, including a networking stack. Meanwhile, an operating system's user space is used to run user applications, as depicted by Appliances 1, 2, and N, and Applications 1A-C, 2A-C, and NA-C.

Generally, Appliances 1, 2, and N are illustrative of various SDN or NFV appliances that may run on virtual machines on platform hardware 502. For simplicity, each $VM_{1-N}$ is depicted as hosting a similar set of software applications; however, this is merely for illustrative purposes, as the VMs for a given platform may host similar applications, or may host different applications. Similarly, each $VM_{1-N}$ may host a single virtual network appliance (as shown), may host multiple virtual network appliances, or may not host any virtual network appliances.

Figure 6:
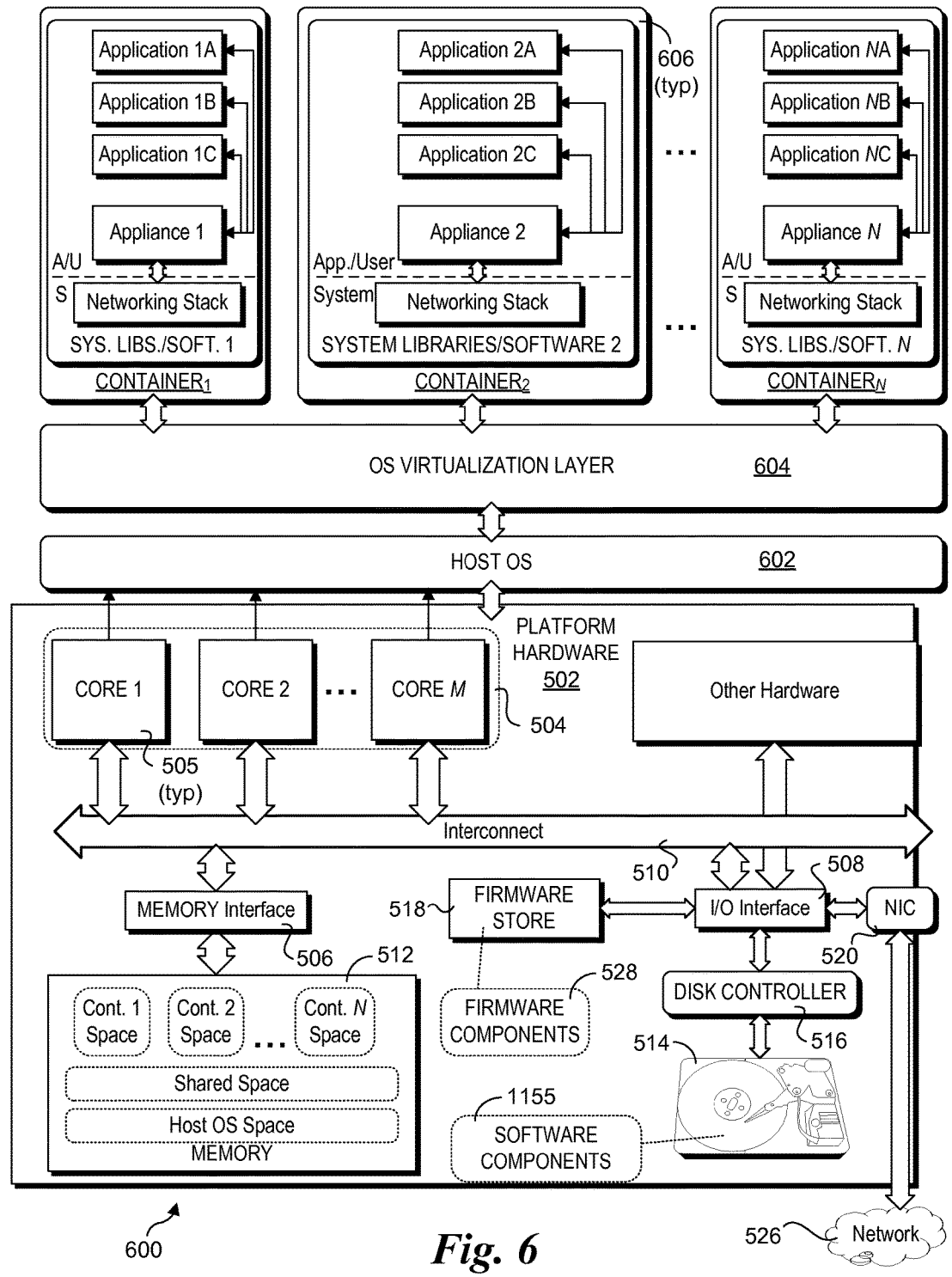
FIG. 6 is a schematic diagram of a second exemplary host platform hardware and software architecture including containers implementing container-based virtualization via which aspects of the embodiments disclosed herein may be implemented.

As discussed above, in addition to virtualizing computer platform using VMs, container-based OS virtualization employing virtualized containers may be implemented. Examples of embodiments employing container-based virtualization are depicted in architecture 100*b* shown in FIG. 1*b* and platform configuration 600 in FIG. 6.

The hardware configuration used in platform configuration 600 is the same as platform configuration 500, as shown. The differences in the platform configurations occur in the software. The software in platform configuration 600 includes a host OS 602, an OS virtualization layer 604, and a plurality of containers 606. Optionally, containers may also be called virtual engines, virtual machines or other terms, depending on the vendor providing the container-based virtualization software or the author describing how container-based OS virtualization works.

Each container includes a set of software libraries and applications logically partitioned into system components and application and/or user components. The system components include system libraries and system software modules. As illustrated, each container includes a networking stack system module or the like. The virtual appliances run in the application/user space. Generally, the virtual appliances may be configured such that they are agnostic to whether they are operating on a VM or a container, or otherwise there are minor differences between virtual appliances configured to run on VMs as opposed to hosted by containers.

Figure 1B:
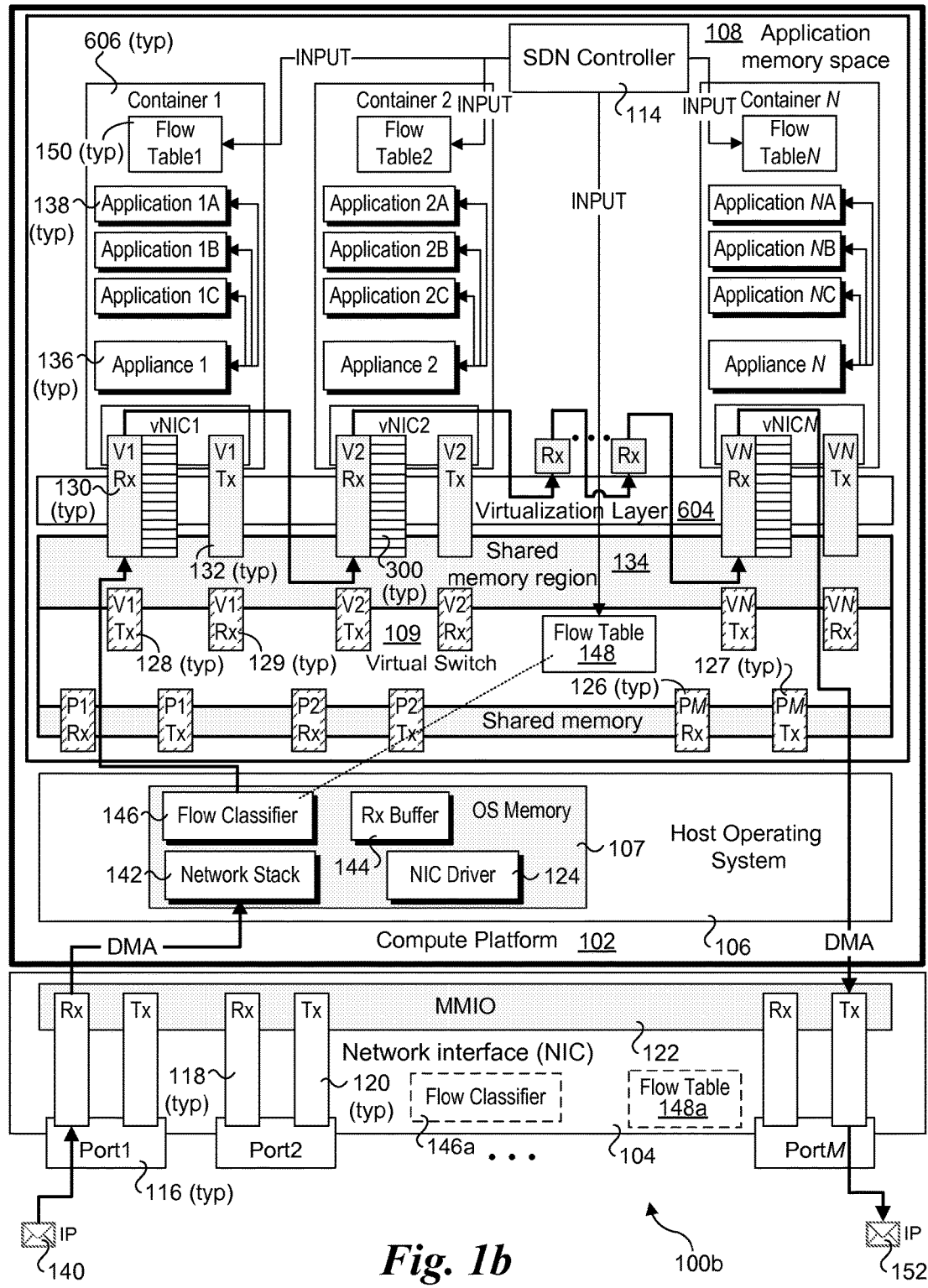
FIG. 1b is schematic diagram illustrating an architecture for a compute platform including virtualized containers configured to perform packet processing operations through the use of LSCs.

As shown in architecture 100*b* of FIG. 1*b*, the architecture components are substantially similar to those shown in architectures 100 and 100*a*, with the primary differences being the Hypervisor being replaced with OS virtualization layer 604 and the VMs being replaced with containers 606. As with the VMs, each container includes a similar set of software components, including a vNIC, one or more virtual appliances 136 and corresponding applications 138, as well as a flow table 150.

In addition to use of IP packets and Ethernet packets, virtualization overlays may be used, such as VXLAN (Virtual Extension Local Area Network) NVGRE (Network Virtualization using Generic Routing), which employ an inner and outer IP address. To implement local service chaining using VXLAN or NVGRE, the presence of overlays would just add to the processing of IP as described in the embodiments above. Further techniques for processing packets using VXLAN and NVGRE are known to those having skill in the art, so further details for implementing embodiments using VXLAN or NVGRE are not described herein.

Further aspects of the subject matter described herein are set out in the following numbered clauses:

1. A method, implemented on a compute platform on which a plurality of virtual machines (VMs) or virtualized containers (containers) are running, each VM or container including a virtual network interface controller (vNIC) communicatively coupled to a virtual switch in a software defined network (SDN), the method comprising:
implementing a local service chain (LSC) via a plurality of virtual network appliances hosted by the plurality of VMs or containers, each virtual network appliance configured to perform one or more services for each of a plurality of packets to be processed by the LSC; and
transferring packet data corresponding to the plurality of packets between VMs or containers without using the virtual switch.

2. The method of clause 1, wherein the packet data is transferred from a first VM or container including a first vNIC having a first receive (Rx) buffer and hosting a current virtual network appliance in the LSC to a second VM or container including a second vNIC having a second Rx buffer and hosting a next virtual network appliance in the LSC by writing packet data directly to the second Rx buffer.

3. The method of clause 2, wherein the packet data is copied from the first Rx buffer to the second Rx buffer.

4. The method of clause 3, wherein at least a portion of the first and second Rx buffers are configured as respective First-in, First-out (FIFO) queues, and packet data for a given packet is copied from one or more slots in a first FIFO queue to one or more slots in the second FIFO queue.

5. The method of any of the proceeding clauses, further comprising:
implementing a plurality of LSCs, each LSC comprising a unique sequence of services to be performed on packets processed using that LSC; and
implementing, for each of the plurality of LSCs, a mechanism to facilitate transfer of packet data for packets assigned to that LSC, wherein, for each LSC the packet data is transferred between VMs or containers hosting the virtual network appliances for that LSC in a chained manner the does not traverse the virtual switch.

6. The method of clause 5, wherein the mechanism comprises a respective local flow table for each VM or container, wherein the local flow table for a given VM or container identifies at least one of a vNIC receive (Rx) port or Rx buffer for a VM or container hosting a next virtual network appliance in the LSC.

7. The method of clause 6, further comprising configuring the local flow table for each VM or container using an SDN controller.

8. The method of any of the proceeding clauses, further comprising:
allocating respective application memory spaces for each of the plurality of VMs or containers, wherein an application running in an application memory space of a VM or container is not able to access the application memory space of another VM or container; and
allocating a shared memory space that is employed for receive buffers employed by virtual network interface controllers (vNICs) for each of the VMs or containers, wherein each VM or container is enabled to read from and write to the shared memory space.

9. The method of any of the proceeding clauses, wherein the compute platform includes a network interface including at least one network port communicatively coupled to the compute platform, the method further comprising:
receiving a packet at a network port of the network interface;
determine at least one of a flow the packet belongs to or an LSC to be used to service the packet; and
forwarding the packet from the network interface to a receive buffer of a vNIC for a VM or container used to host a first virtual network appliance defined for the LSC.

10. The method of clause 9, wherein the packet is forwarded by copying packet data for the packet from a receive buffer in a memory-mapped input-output (MMIO) address space of the network interface to the receive buffer of the vNIC using a Direct Memory Access (DMA) data transfer.

11. The method of any of the proceeding clauses, wherein the compute platform includes a network interface including at least one network port communicatively coupled to the compute platform, the method further comprising:

for each packet received from a network at a predefined network port of the network interface, buffering packet data for the packet in a receive buffer in a memory-mapped input-output (MMIO) address space of the network interface; and copying the packet data for the packet from the receive buffer to a receive buffer of a vNIC for a VM or container used to host a first virtual network appliance defined for the LSC using a Direct Memory Access (DMA) data transfer.

12. The method of any of the proceeding clauses, wherein the compute platform includes a network interface including at least one network port communicatively coupled to the compute platform, further comprising employing the same LSC for all packets received at a predefined network port.

13. The method of any of the proceeding clauses further comprising:

determining a virtual appliance is the last virtual appliance in an LSC used for a given packet;

determining an output port on a physical network adaptor the packet is to be forwarded out of; and forwarding packet data from a buffer on a VM or container hosting the last virtual appliance to a buffer associated with the output port of the physical network adaptor in a manner that bypasses the virtual switch.

14. The method of clause 13, wherein the compute platform includes a network interface including at least one network port communicatively coupled to the compute platform, the method further comprising:

for each packet received from a network at a predefined network port of the network interface, buffering packet data for the packet in a receive buffer in a memory-mapped input-output (MMIO) address space of the network interface; and copying the packet data for the packet from the receive buffer to a receive buffer of a vNIC for a VM or container used to host a first virtual network appliance defined for the LSC using a Direct Memory Access (DMA) data transfer.

15. A non-transitory machine-readable medium, having a plurality of instructions stored thereon that are configured to be executed on a processor of a compute platform on which a plurality of VMs or containers are to be run, wherein execution of the plurality of instructions causes the compute platform to perform the method of any of the proceeding clauses.

16. A compute platform comprising means for implementing the method of any of clauses 1-14.

17. A non-transitory machine-readable medium, having a plurality of instructions stored thereon that are configured to be executed on a processor of a compute platform on which a plurality of virtual machines (VMs) or virtualized containers (containers) are to be run, at least a portion of the VMs or containers including a virtual network interface controller (vNIC) communicatively coupled to a virtual switch in a software defined network (SDN) and hosting a virtual network appliance, wherein execution of the plurality of instructions causes the compute platform to:

implement a local service chain (LSC) via a plurality of the virtual network appliances, each virtual network appliance configured to perform one or more services for each of a plurality of packets to be processed by the LSC; and transfer packet data corresponding to the plurality of packets between VMs or containers by writing packet data from a buffer accessible to a first VM or container hosting a first virtual network appliance configured to perform a current service in the LSC to a receive (Rx) buffer of a vNIC of a second VM or container hosting a second virtual network appliance configured to perform a next service in the LSC.

18. The non-transitory machine-readable medium of clause 17, wherein the Rx buffer of the vNIC of the second VM or container comprises a second Rx buffer, and wherein the packet data is copied from a first Rx buffer of a vNIC for the first VM or container to the second Rx buffer.

19. The non-transitory machine-readable medium of clause 17 or 18, wherein execution of the plurality of instructions further causes the compute platform to:

configure at least a portion of the first and second Rx buffers as respective first and second First-in, First-out (FIFO) queues; and copy packet data for a given packet from one or more slots in a first FIFO queue to one or more slots in the second FIFO queue.

20. The non-transitory machine-readable medium of any of clauses 17-19, wherein execution of the plurality of instructions further causes the compute platform to:

implement a plurality of LSCs, each LSC comprising a unique sequence of services to be performed on packets processed using that LSC; and configure a local flow table for each VM or container hosting a virtual network appliance, wherein the local flow table for a given VM or container includes an entry for each of the LSCs that include a service to be performed by a virtual network appliance hosted by that VM or container, and the entry for each LSC identifies at least one of a vNIC receive (Rx) port or Rx buffer for a VM or container hosting a next virtual network appliance in the LSC.

21. The non-transitory machine-readable medium of clause 20, wherein the plurality of instructions further include instructions for implementing a SDN controller that, when executed, configures the local flow table for each VM or container.

22. The non-transitory machine-readable medium of any of clauses 17-21, wherein execution of the plurality of instructions further causes the compute platform to allocate a shared memory space that is employed for receive buffers employed by vNICs for each of the VMs or containers, wherein each VM or container is enabled to read from and write to the shared memory space.

23. The non-transitory machine-readable medium of clause 22, wherein execution of the plurality of instructions further causes the compute platform to allocate respective application memory spaces for each of the plurality of VMs or containers, wherein an application running in an application memory space of a VM or container is not able to access the application memory space of another VM or container.

24. The non-transitory machine-readable medium of any of clauses 17-23, wherein the compute platform includes a network interface including at least one network port communicatively coupled to the compute platform, and wherein execution of the plurality of instructions further causes the compute platform to:

determine at least one of a flow a packet received at the network interface belongs to or an LSC to be used to service the packet; and forward the packet from the network interface to a receive buffer of a vNIC for a VM or container used to host a first virtual network appliance defined for the LSC.

25. The non-transitory machine-readable medium of clause 24, wherein the packet is forwarded by copying packet data for the packet from a receive buffer in a memory-mapped input-output (MMIO) address space of the network interface to the receive buffer of the vNIC using a Direct Memory Access (DMA) data transfer.

26. The non-transitory machine-readable medium of any of clauses 17-25, wherein the compute platform includes a network interface including at least one network port communicatively coupled to the compute platform and memory, and wherein execution of the plurality of instructions further causes the compute platform to:

configure at least a portion of the memory on the network interface as a memory-mapped input-output (MMIO) address space; and configure the network interface to, buffer packet data for each of a plurality of packets received from a network at a predefined network port of the network interface in a receive buffer in the MMIO address space; and copy packet data for each packet from the receive buffer to a receive buffer of a vNIC for a VM or container used to host a first virtual network appliance defined for the LSC using a Direct Memory Access (DMA) data transfer.

27. The non-transitory machine-readable medium of any of clauses 17-26, wherein execution of the plurality of instructions further causes the compute platform to:

determine a flow a packet belongs to;

determine an LSC to be used to service packets belonging to the flow; and add indicia to the packet identifying the LSC to be used to service the packet.

28. A compute platform, comprising:

a processor, including a plurality of processor cores;

system memory, operatively coupled to the processor;

a network interface controller (NIC) including at least one network port and memory, operatively coupled to the processor; and a storage device, having a plurality of instructions stored thereon including instructions that are configured to be executed via one or more of the processor cores to cause the apparatus to, instantiate a plurality of virtual machines (VMs) or virtualized containers (containers), each VM or container including a virtual network interface controller (vNIC), at least a portion of the VMs or containers hosting a virtual network appliance;

configure a software defined network (SDN) on the platform including a virtual switch having virtual network ports coupled to respective vNICs and at least one network port on the NIC;

implement a local service chain (LSC) via a plurality of the virtual network appliances, each virtual network appliance configured to perform one or more services for each of a plurality of packets to be processed by the LSC; and transfer packet data corresponding to the plurality of packets between VMs or containers by writing packet data from a buffer accessible to a first VM or container hosting a first virtual network appliance configured to perform a current service in the LSC to a receive (Rx) buffer of a vNIC of a second VM or container hosting a second virtual network appliance configured to perform a next service in the LSC.

29. The compute platform of clause 28, wherein execution of the plurality of instructions further causes the compute platform to:

implement a plurality of LSCs, each LSC comprising a unique sequence of services to be performed on packets processed using that LSC; and configure a local flow table for each VM or container hosting a virtual network appliance, wherein the local flow table for a given VM or container includes an entry for each of the LSCs that include a service to be performed by a virtual network appliance hosted by that VM or container, and the entry for each LSC identifies at least one of a vNIC receive (Rx) port or Rx buffer for a VM or container hosting a next virtual network appliance in the LSC.

30. The compute platform of clause 28 or 29, wherein execution of the plurality of instructions further causes the compute platform to allocate a shared memory space that is employed for receive buffers employed by vNICs for each of the VMs or containers, wherein each VM or container is enabled to read from and write to the shared memory space.

31. The compute platform of any of clauses 28-30, wherein execution of the plurality of instructions further causes the compute platform to:

determine at least one of a flow a packet received at the NIC belongs to or an LSC to be used to service the packet; and forward the packet from the NIC to a receive buffer of a vNIC for a VM or container used to host a first virtual network appliance defined for the LSC.

32. The compute platform of any of clauses 28-31, wherein execution of the plurality of instructions further causes the compute platform to:

configure at least a portion of the memory on the NIC as a memory-mapped input-output (MMIO) address space; and configure the NIC to, buffer packet data for each of a plurality of packets received from a network at a predefined network port of the network interface in a receive buffer in the MMIO address space; and copy packet data for each packet from the receive buffer to a receive buffer of a vNIC for a VM or container used to host a first virtual network appliance defined for the LSC using a Direct Memory Access (DMA) data transfer.

33. A compute platform, comprising:

a network interface controller (NIC) including at least one network port and memory, and means for, instantiating a plurality of virtual machines (VMs) or virtualized containers (containers), each VM or container including a virtual network interface controller (vNIC), at least a portion of the VMs or containers hosting a virtual network appliance;

configuring a software defined network (SDN) on the platform including a virtual switch having virtual network ports coupled to respective vNICs and at least one network port on the NIC;

implementing a local service chain (LSC) via a plurality of the virtual network appliances, each virtual network appliance configured to perform one or more services for each of a plurality of packets to be processed by the LSC; and transferring packet data corresponding to the plurality of packets between VMs or containers by writing packet data from a buffer accessible to a first VM or container hosting a first virtual network appliance configured to perform a current service in the LSC to a receive (Rx) buffer of a vNIC of a second VM or container hosting a second virtual network appliance configured to perform a next service in the LSC.

34. The compute platform of clause 33, further comprising means for:

implementing a plurality of LSCs, each LSC comprising a unique sequence of services to be performed on packets processed using that LSC; and configuring a local flow table for each VM or container hosting a virtual network appliance, wherein the local flow table for a given VM or container includes an entry for each of the LSCs that include a service to be performed by a virtual network appliance hosted by that VM or container, and the entry for each LSC identifies at least one of a vNIC receive (Rx) port or Rx buffer for a VM or container hosting a next virtual network appliance in the LSC.

35. The compute platform of clause 33 or 34, further comprising means for allocating a shared memory space that is employed for receive buffers employed by vNICs for each of the VMs or containers, wherein each VM or container is enabled to read from and write to the shared memory space.

36. The compute platform of any of clauses 33-35, further comprising means for:

determining at least one of a flow a packet received at the NIC belongs to or an LSC to be used to service the packet; and forwarding the packet from the NIC to a receive buffer of a vNIC for a VM or container used to host a first virtual network appliance defined for the LSC.

37. The compute platform of any of clauses 33-36, further comprising means for:

configuring at least a portion of the memory on the NIC as a memory-mapped input-output (MMIO) address space; and configuring the NIC to, buffer packet data for each of a plurality of packets received from a network at a predefined network port of the network interface in a receive buffer in the MMIO address space; and copy packet data for each packet from the receive buffer to a receive buffer of a vNIC for a VM or container used to host a first virtual network appliance defined for the LSC using a Direct Memory Access (DMA) data transfer.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Italicized letters, such as 'M' and 'N', in the foregoing detailed description and are used to depict an integer number, and the use of a particular letter is not limited to particular embodiments. Moreover, the same letter may be used to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software running on a server or device processor or software and/or firmware executed by an embedded processor or the like. Thus, embodiments of this invention may be used as or to support a software program, software modules, firmware, and/or distributed software executed upon some form of processing core (such as the CPU of a computer, one or more cores of a multi-core processor), a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method comprising:
   implementing, on a single compute platform, a software defined network (SDN) including a virtual switch, the compute platform running a plurality of virtual machines (VMs) or virtualized containers (containers), each VM or container including a virtual network interface controller (vNIC) communicatively coupled to the virtual switch; implementing a local service chain (LSC) via a plurality of virtual network appliances hosted by the plurality of VMs or containers running on the compute platform, each virtual network appliance configured to perform one or more services for each of a plurality of packets to be processed by the LSC; and
   transferring packet data corresponding to the plurality of packets between VMs or containers to effect the LSC without using the virtual switch,
   wherein the packet data is transferred from a first VM or container including a first vNIC having a first receive (Rx) buffer and hosting a current virtual network appliance in the LSC to a second VM or container including a second vNIC having a second Rx buffer and hosting a next virtual network appliance in the LSC by writing packet data directly to the second Rx buffer.

2. The method of claim 1, wherein the packet data is copied from the first Rx buffer to the second Rx buffer.

3. The method of claim 2, wherein at least a portion of the first and second Rx buffers are configured as respective First-in, First-out (FIFO) queues, and packet data for a given packet is copied from one or more slots in a first FIFO queue to one or more slots in the second FIFO queue.

4. The method of claim 1, further comprising:
   implementing a plurality of LSCs on the compute platform, each LSC comprising a unique sequence of services to be performed on packets processed using that LSC; and
   implementing, for each of the plurality of LSCs, a mechanism to facilitate transfer of packet data for packets assigned to that LSC, wherein, for each LSC the packet data is transferred between VMs or containers hosting the virtual network appliances for that LSC in a chained manner the does not traverse the virtual switch.

5. The method of claim 4, wherein the mechanism comprises a respective local flow table for each VM or container, wherein the local flow table for a given VM or container identifies at least one of a vNIC receive (Rx) port or Rx buffer for a VM or container hosting a next virtual network appliance in the LSC.

6. The method of claim 5, further comprising configuring the local flow table for each VM or container using an SDN controller.

7. The method of claim 1, further comprising:
   allocating respective application memory spaces for each of the plurality of VMs or containers, wherein an application running in an application memory space of a VM or container is not able to access the application memory space of another VM or container; and
   allocating a shared memory space that is employed for receive buffers employed by vNICs for each of the VMs or containers, wherein each VM or container is enabled to read from and write to the shared memory space.

8. The method of claim 1, wherein the compute platform includes a network interface including at least one network port communicatively coupled to the compute platform, the method further comprising:
   receiving a packet at a network port of the network interface;
   determining at least one of a flow the packet belongs to or an LSC to be used to service the packet; and
   forwarding the packet from the network interface to a receive buffer of a vNIC for a VM or container used to host a first virtual network appliance defined for the LSC.

9. The method of claim 8, wherein the packet is forwarded by copying packet data for the packet from a receive buffer in a memory-mapped input-output (MMIO) address space of the network interface to the receive buffer of the vNIC using a Direct Memory Access (DMA) data transfer.

10. The method of claim 1, wherein the compute platform includes a network interface including at least one network port communicatively coupled to the compute platform, the method further comprising:
    for each packet received from a network at a predefined network port of the network interface,
    buffering packet data for the packet in a receive buffer in a memory-mapped input-output (MMIO) address space of the network interface; and
    copying the packet data for the packet from the receive buffer to a receive buffer of a vNIC for a VM or container used to host a first virtual network appliance defined for the LSC using a Direct Memory Access (DMA) data transfer.

11. A non-transitory machine-readable medium, having a plurality of instructions stored thereon that are configured to be executed on a processor of a compute platform on which a plurality of virtual machines (VMs) or virtualized containers (containers) are to be run and a software defined network (SDN) including a virtual switch is to be implemented, at least a portion of the VMs or containers including a virtual network interface controller (vNIC) communicatively coupled to the virtual switch and hosting a virtual network appliance, wherein execution of the plurality of instructions causes the compute platform to:

implement a local service chain (LSC) via a plurality of the virtual network appliances, each virtual network appliance configured to perform one or more services for each of a plurality of packets to be processed by the LSC; and transfer packet data corresponding to the plurality of packets between VMs or containers by writing packet data from a buffer accessible to a first VM or container hosting a first virtual network appliance configured to perform a current service in the LSC to a receive (Rx) buffer of a vNIC of a second VM or container hosting a second virtual network appliance configured to perform a next service in the LSC.

12. The non-transitory machine-readable medium of claim 11, wherein the Rx buffer of the vNIC of the second VM or container comprises a second Rx buffer, and wherein the packet data is copied from a first Rx buffer of a vNIC for the first VM or container to the second Rx buffer.

13. The non-transitory machine-readable medium of claim 11, wherein execution of the plurality of instructions further causes the compute platform to:

configure at least a portion of the first and second Rx buffers as respective first and second First-in, First-out (FIFO) queues; and copy packet data for a given packet from one or more slots in a first FIFO queue to one or more slots in the second FIFO queue.

14. The non-transitory machine-readable medium of claim 11, wherein execution of the plurality of instructions further causes the compute platform to:

implement a plurality of LSCs, each LSC comprising a unique sequence of services to be performed on packets processed using that LSC; and configure a local flow table for each VM or container hosting a virtual network appliance, wherein the local flow table for a given VM or container includes an entry for each of the LSCs that include a service to be performed by a virtual network appliance hosted by that VM or container, and the entry for each LSC identifies at least one of a vNIC receive (Rx) port or Rx buffer for a VM or container hosting a next virtual network appliance in the LSC.

15. The non-transitory machine-readable medium of claim 11, wherein execution of the plurality of instructions further causes the compute platform to allocate a shared memory space that is employed for receive buffers employed by vNICs for each of the VMs or containers, wherein each VM or container is enabled to read from and write to the shared memory space.

16. The non-transitory machine-readable medium of claim 11, wherein the compute platform includes a network interface including at least one network port communicatively coupled to the compute platform, and wherein execution of the plurality of instructions further causes the compute platform to:

determine at least one of a flow a packet received at the network interface belongs to or an LSC to be used to service the packet; and forward the packet from the network interface to a receive buffer of a vNIC for a VM or container used to host a first virtual network appliance defined for the LSC.

17. The non-transitory machine-readable medium of claim 16, wherein the packet is forwarded by copying packet data for the packet from a receive buffer in a memory-mapped input-output (MMIO) address space of the network interface to the receive buffer of the vNIC using a Direct Memory Access (DMA) data transfer.

18. The non-transitory machine-readable medium of claim 11, wherein the compute platform includes a network interface including at least one network port communicatively coupled to the compute platform and memory, and wherein execution of the plurality of instructions further causes the compute platform to:

configure at least a portion of the memory on the network interface as a memory-mapped input-output (MMIO) address space; and configure the network interface to, buffer packet data for each of a plurality of packets received from a network at a predefined network port of the network interface in a receive buffer in the MMIO address space; and copy packet data for each packet from the receive buffer to a receive buffer of a vNIC for a VM or container used to host a first virtual network appliance defined for the LSC using a Direct Memory Access (DMA) data transfer.

19. The non-transitory machine-readable medium of claim 11, wherein execution of the plurality of instructions further causes the compute platform to:

determine a flow a packet belongs to;

determine an LSC to be used to service packets belonging to the flow; and add indicia to the packet identifying the LSC to be used to service the packet.

20. A compute platform, comprising:

a processor, including a plurality of processor cores;

system memory, operatively coupled to the processor;

a network interface controller (NIC) including at least one network port and memory, operatively coupled to the processor; and a storage device, having a plurality of instructions stored thereon including instructions configured to be executed via one or more of the processor cores to cause the compute platform to, instantiate a plurality of virtual machines (VMs) or virtualized containers (containers), each VM or container including a virtual network interface controller (vNIC), at least a portion of the VMs or containers hosting a virtual network appliance;

configure a software defined network (SDN) on the platform including a virtual switch having virtual network ports coupled to respective vNICs and at least one network port on the NIC;

implement a local service chain (LSC) via a plurality of the virtual network appliances, each virtual network appliance configured to perform one or more services for each of a plurality of packets to be processed by the LSC; and transfer packet data corresponding to the plurality of packets between VMs or containers by writing packet data from a buffer accessible to a first VM or container hosting a first virtual network appliance configured to perform a current service in the LSC to a receive (Rx) buffer of a vNIC of a second VM or container hosting a second virtual network appliance configured to perform a next service in the LSC.

21. The compute platform of claim 20, wherein execution of the plurality of instructions further causes the compute platform to:
implement a plurality of LSCs, each LSC comprising a unique sequence of services to be performed on packets processed using that LSC; and
configure a local flow table for each VM or container hosting a virtual network appliance, wherein the local flow table for a given VM or container includes an entry for each of the LSCs that include a service to be performed by a virtual network appliance hosted by that VM or container, and the entry for each LSC identifies at least one of a vNIC receive (Rx) port or Rx buffer for a VM or container hosting a next virtual network appliance in the LSC.

22. The compute platform of claim 20, wherein execution of the plurality of instructions further causes the compute platform to allocate a shared memory space that is employed for receive buffers employed by vNICs for each of the VMs or containers, wherein each VM or container is enabled to read from and write to the shared memory space.

23. The compute platform of claim 20, wherein execution of the plurality of instructions further causes the compute platform to:
determine at least one of a flow a packet received at the NIC belongs to or an LSC to be used to service the packet; and
forward the packet from the NIC to a receive buffer of a vNIC for a VM or container used to host a first virtual network appliance defined for the LSC.

24. The compute platform of claim 20, wherein execution of the plurality of instructions further causes the compute platform to:
configure at least a portion of the memory on the NIC as a memory-mapped input-output (MMIO) address space; and
configure the NIC to,
buffer packet data for each of a plurality of packets received from a network at a predefined network port of the network interface in a receive buffer in the MMIO address space; and
copy packet data for each packet from the receive buffer to a receive buffer of a vNIC for a VM or container used to host a first virtual network appliance defined for the LSC using a Direct Memory Access (DMA) data transfer.

* * * * *